United States Patent [19]
Neefe

[11] 4,188,353
[45] Feb. 12, 1980

[54] METHOD OF MAKING ASPHERIC LENSES

[76] Inventor: Charles W. Neefe, Box 429, Big Spring, Tex. 79720

[21] Appl. No.: 5,598

[22] Filed: Jan. 22, 1979

Related U.S. Application Data

[63] Continuation-in-part of Ser. No. 874,934, Feb. 3, 1978, which is a continuation-in-part of Ser. No. 793,388, May 25, 1977, abandoned.

[51] Int. Cl.² ............................................ B29D 11/00
[52] U.S. Cl. ..................................... 264/1; 264/219; 264/313; 425/808
[58] Field of Search ................... 264/1, 219, 220, 313; 425/808

[56] References Cited
U.S. PATENT DOCUMENTS

| | | | |
|---|---|---|---|
| 3,251,908 | 5/1966 | Wilenino et al. | 264/1 |
| 3,422,168 | 1/1969 | Bowser | 264/1 |
| 3,876,734 | 4/1975 | Howden | 264/1 |
| 3,903,218 | 9/1975 | Humphrey | 264/1 |

*Primary Examiner*—James B. Lowe

[57] ABSTRACT

A method of making plastic aspheric lenses by casting a liquid monomer in a container, polymerizing the monomer to form a solid having an aspheric optical surface formed within the container and cutting a second optical surface on the solid lens material with the container supporting the lens material during the cutting and polishing operation.

1 Claim, 3 Drawing Figures

METHOD OF MAKING ASPHERIC LENSES

Continuation-in-part of application Ser. No. 874,934, filed Feb. 3, 1978, entitled: A METHOD OF CONTROLLING THE ADESION OF A MOLDED PLASTIC LENS, which is a continuation-in-part of application Ser. No. 793,388, filed May 25, 1977, now abandoned, entitled: A METHOD OF MAKING HIGH QUALITY PLASTIC LENSES.

FIELD OF THE INVENTION

The use of plastic materials for making optical lenses has increased rapidly for the past ten years. This is due to the availability of better plastic materials and the physical advantages of the plastic resins for specific applications such as opthalmic lenses. The technology for the production of high quality plastic lenses has not kept pace with the material supply industry. It is important to advance both areas if the full potential is to be realized.

Plastic lenses offer many advantages over glass lenses. They are much lighter in weight and resist breakage. The cost of making high quality lenses has been high due to the problems caused by the shrinkage of the monomer when polymerized, which often breaks the expensive molds.

STATE OF THE ART

The current lens molds are fabricated from steel or glass, each mold is individually ground and polished to the required specifications. To achieve accurate reproduction of the bifocal and aspheric molds is most difficult and expensive.

An object is to provide a process for making inexpensive aspheric molds which may be made to identical specifications.

Another object is to provide a process whereby standard masters may be used to produce a large quantity of replica molds.

The replica mold also serves as a holding fixture during the cutting and polishing of the second optical surface.

The lenses are made as follows:

A master positive mold is made from glass or stainless steel or other materials which will withstand the molding temperatures.

The master mold is placed in a molding sleeve and a molding grade of a resinous material such as polyimide, polycarbonate, polymethylpentene, polyethylene, polypropylene, nylon or other molding material is placed in the molding sleeve.

DESCRIPTION OF THE PREFERRED EMBODIMENT

Figure 1:
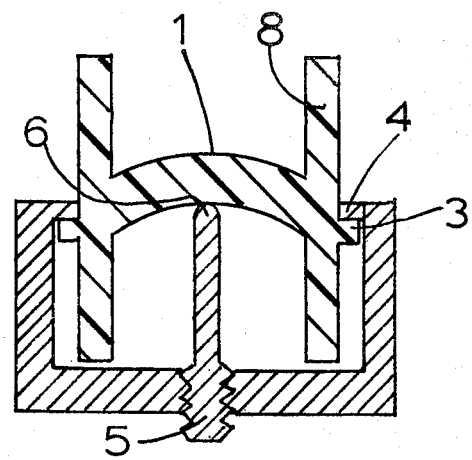
FIG. 1 shows the resinous mold positioned in the distortion clamp.
Figure 2:
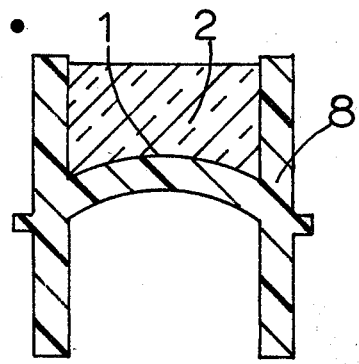
FIG. 2 shows the polymerized lens material with an aspheric surface molded on the resinous lens.
Figure 3:
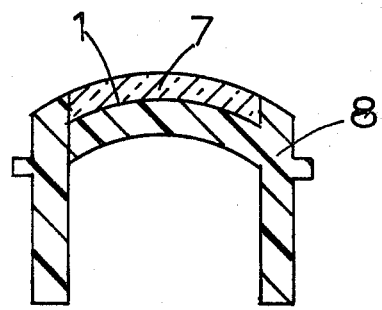
FIG. 3 shows the lens with the second optical surface cut and in the resinous mold.

The molding sleeve and it's contents are heated to the softening point of the molding material, pressure is applied to form the lens mold, 8 FIGS. 1, 2 and 3. The sides of the master mold are cut to a diameter smaller than the inside of the molding sleeve whereby, with suffcent heat and pressure, the molding resin will fill the area around the master mold forming a cup-like cavity with a curved spherical optical surface at the bottom. An external positioning ring around the cylinder may be provided by employing a two piece sleeve by methods well known to the molding art. Either injection or compression molding may be used to produce the lens molding container, 8 FIGS. 1, 2 and 3. The resinous mold, 8 FIG. 1, is placed in an oven and heated to the working temperature of the resinous material. The working temperature will be below the glass transition temperature and below the temperature at which changes in the curvature of the optical surface, 1 FIG. 1, occur. The most desirable temperature is 7° C. below the temperature at which a change in the curvature of the optical surface, 1 FIG. 1, occurs. The resinous mold, 8 FIG. 1, is heated to the working temperature and placed in the distortion clamp, 4 FIG. 1, the shoulder, 3 FIG. 1, rests against the inside of clamp, 4 FIG. 1, the distortion screw, 5 FIG. 1, is turned to bring the distortion rod, 6 FIG. 1, in contact with the back non-optical concave side of the cup-like cavity. Pressure is applied to the concave backside of the convex spherical optical surface, 1 FIG. 1, by rod, 6 FIG. 1, to distort the convex spherical surface, 1 FIG. 1, into an aspheric surface having a shorter radius at the center and a longer radius at the edge. The resinous mold is allowed to cool to room temperature, the distortion pressure is released and the distortion clamp, 4 FIG. 1, is removed leaving the surface, 1 FIGS. 2 and 3 aspheric.

Casting the aspheric optical surface:

A liquid or syrup monomer material containing a suitable catalyst is placed over the aspheric optical surface and covered to prevent evaporation. The liquid monomer is polymerized to form a solid, 2 FIG. 1. Microwave energy or heat may be used to speed the polymerization process. Thermosetting and crosslinked materials may be used to produce lenses which are dimensionally stable. This process is suitable for the production of aspheric soft contact lenses which cannot be made by compression or injection molding techniques.

Cutting the second optical surface:

It is not necessary to remove the hardened plastic lens material, 2 FIG. 2, from the mold, 8 FIG. 2, before cutting the convex curve, 7 FIG. 3. The mold, 8 FIG. 3, may be placed in a suitable lathe and curvature, 7 FIG. 3, cut and polished. The finished lens having the molded aspheric concave surface, 1 FIG. 3, and the convex curvature, 7 FIG. 3, which was cut and polished without being removed from the disposable mold, 8 FIG. 3. The cup-like device has served as a container for the monomer and provided the molded aspheric optical surface. The cup-like mold, 8 FIG. 2, also serves as the holding block to facilitate cutting to the required thickness. The thickness of the cup bottom may be measured before adding the liquid monomer and measurements may be taken during the cutting operation and the lens thickness determined by subtracting the thickness of the cup bottom. The cup, 8 FIG. 2, which adheres strongly to the lens also serves as a holding fixture during the polishing operation.

Removing the finished lens:

After the aspheric lens is processed to the required specifications, the lens is removed by sharply flexing the holding fixture, 8 FIG. 3, separating the finished aspheric lens from it's support.

Various modifications can be made without departing from the spirit of this invention or the scope of the appended claims. The constants set forth in the disclosure are given as examples and are in no way final or binding. In view of the above, it will be seen that the several objects of the invention are achieved and other advantages are obtained. As many changes could be made in the above construction and method without departing from the scope of the invention, it is intended that all matter contained in the above description shall be interpreted as illustrative and not in a limiting sense.

That which is claimed is:

1. A method of casting and removing from a resinous lens mold an aspheric optical lens of polymeric material, said mold of resinous material having at one end a cup-like molding cavity with a spherical optical surface and at the other end an opening, heating the resinous mold to a working temperature below the glass transition temperature of the resinous mold material, applying sufficient external pressure against the bottom non-optical surface of the cup-like molding cavity to change the spherical optical surface to an aspheric surface, allowing the resinous mold to cool before removing the external applied pressure, casting a liquid monomer in the molding cavity, polymerizing the monomer to form a rigid solid, having a first aspheric optical surface adhering to the optical surface of the mold with sufficient adhesive strength to allow cutting and polishing of a second optical surface, cutting and polishing the surface of the said rigid solid on the side opposite the first aspheric optical surface to form a second optical surface while the rigid solid is held by the mold, and then removing the thus formed aspheric lens by applying pressure against the sides of the mold to distort the shape of the optical surface of the mold to thereby release the aspheric lens from the mold.

* * * * *